United States Patent [19]

Scragg et al.

[11] 4,175,381

[45] Nov. 27, 1979

[54] ELECTROMAGNETIC REACTOR ENGINE SYSTEM-APPARATUS AND METHOD

[75] Inventors: Robert L. Scragg; Alfred B. Parker, both of Miami, Fla.

[73] Assignee: Solar Reactor Corporation, Miami, Fla.

[21] Appl. No.: 857,895

[22] Filed: Dec. 6, 1977

Related U.S. Application Data

[63] Continuation-in-part of Ser. No. 692,495, Jun. 3, 1976, Pat. No. 4,070,861, which is a continuation-in-part of Ser. No. 657,383, Feb. 10, 1976, Pat. No. 4,026,112, which is a continuation-in-part of Ser. No. 588,888, Jun. 20, 1975, Pat. No. 4,024,715, which is a continuation-in-part of Ser. No. 564,087, Apr. 1, 1975, Pat. No. 3,998,205.

[51] Int. Cl.$^2$ ............................................. F02B 43/00
[52] U.S. Cl. ...................................... 60/39.12; 60/203; 60/641; 60/649
[58] Field of Search ........ 60/39.12, 39.46 R, 39.46 G, 60/203, 641, 651, 649, 671, 673; 123/1 A, DIG. 12, 119 E

[56] References Cited

U.S. PATENT DOCUMENTS

4,026,112 5/1977 Scragg et al. ........................... 60/641
4,070,861 1/1978 Scragg et al. .................... 60/39.46 X

FOREIGN PATENT DOCUMENTS

745671 5/1933 France ................................. 123/119 E

OTHER PUBLICATIONS

Rockets, Oct. 1945, p. 10.

Primary Examiner—Allen M. Ostrager
Assistant Examiner—Stephen F. Husar
Attorney, Agent, or Firm—Cushman, Darby & Cushman

[57] ABSTRACT

An electromagnetic reactor engine system is disclosed wherein hydrogen and chlorine are conducted into a reactor and are combined with controlled explosive violence when exposed to electromagnetic radiation. Atmospheric oxygen is used as a control medium to regulate the energy given off by the reaction. The gases thus formed drive a turbine assembly, the output of which powers a suitable utilization device. The spent gas, hydrogen chloride, is converted to hydrochloric acid in a gas-water reactor when exhausted by the turbine. The hydrochloric acid is fed to a hydrochloric acid electrolysis cell for recycling to hydrogen and chlorine. Various means are provided for supplying the initial quantities of hydrogen and chlorine to the reactor to begin the cycle.

20 Claims, 5 Drawing Figures

ELECTROMAGNETIC REACTOR ENGINE SYSTEM-APPARATUS AND METHOD

BACKGROUND OF THE INVENTION

This invention is a continuation-in-part of copending application Ser. No. 692,495, filed June 3, 1976 now U.S. Pat. No. 4,070,861, entitled SOLAR REACTOR COMBUSTION CHAMBER, which, in turn, was a continuation-in-part of application Ser. No. 657,383, filed Feb. 10, 1976, entitled SOLAR REACTOR ENGINE, issued as U.S. Pat. No. 4,026,112, which, in turn, was a continuation-in-part of application Ser. No. 588,888, filed June 20, 1975, entitled SOLAR REACTOR ENGINE, issued as U.S. Pat. No. 4,024,715, which, in turn, was a continuation-in-part of application Ser. No. 564,087, filed Apr. 1, 1975, entitled SOLAR REACTOR STEAM GENERATOR METHOD AND APPARATUS, issued as U.S. Pat. No. 3,998,205. Each of these applications or patents is incorporated herein by reference thereto.

This invention relates to reactors and turbine engine systems and more particularly relates to electromagnetic reactors and gas turbine engine systems which utilize the controlled energies developed by the combination of hydrogen and chlorine when exposed to electromagnetic energy. The methods of electrolyzing hydrogen and chlorine from sea water or brine, or from hydrochloric acid using less energy, and the methods and sources of obtaining the reactant gases, hydrogen and chlorine, without electrolysis are well known in the art.

In the process of converting energy into mechanical and electrical power, many forms of energy converters have been utilized. The most widely used converters are gasoline and diesel engines, jet engines and gas turbine engines. All of these engines convert fossil fuel into kinetic energy which is then converted directly to mechanical power. Another example of a converter commonly used in the art is the steam boiler. The steam boiler converts fossil energy into kinetic energy which is then converted to mechanical power by means of a steam turbine. It is a characteristic of all of the above-identified energy converters that their efficiency does not exceed 40%. Thus, only 40% of the input BTUs in fuel is converted to output horsepower. Further, each of the aforementioned engines operates with detrimental environmental effects; and all are dependent upon fossil fuels or refined fossil fuels which require tremendous capital investments for recovery, refining and distribution and none of these fuels are recyclable. Therefore, the total energy of the fuel plus the recovery and refining energy are totally consumed in one reaction.

It therefore is an object of this invention to provide a method for producing electromagnetic-chemical energy that is convertible to mechanical and/or electrical power.

It is another object of this invention to provide a method of utilizing recyclable fuels and reactants, which can be produced by electrolysis cells and stored.

It is yet another object of this invention to provide a method of utilizing reactant gases such as hydrogen chloride or hydrogen and chlorine which can be derived from natural sources.

It is another object of this invention to provide a method of converting exhaust gases back to fuel and reactants thereby resulting in higher efficiencies for the engine.

It is yet another object of this invention to provide a method of fueling a gas turbine engine system which generates no harmful emissions.

It is yet another object of this invention to provide a method of fueling a gas turbine engine system which is more efficient than existing energy converters.

Another object of this invention is to provide a method of fueling a gas turbine engine system that does not utilize fossil or nuclear fuels which may potentially pollute or otherwise harm the environment about the generator.

SHORT STATEMENT OF THE INVENTION

Accordingly, the present invention is an electromagnetic reactor engine system including an electromagnetic reactor having means for controllably coupling quantities of chlorine and hydrogen thereto. The gases are initially derived either from the electrolysis of sea water or brine or from natural sources. The hydrogen and chlorine in the reactor react exothermically when exposed to electromagnetic radiation to generate hydrogen chloride at a high temperature and pressure. A turbine is positioned on at least a portion of at least one wall of the reactor so that the pressurized hydrogen chloride drives a turbine. A gas-water reactor scrubber is positioned on the opposite side of the turbine from the reactor wherein the hydrogen chloride is converted to hydrochloric acid then dropped into a receiver tank below the scrubber. The hydrochloric acid is fed to an electrolyzer which converts the hydrochloric acid to hydrogen and chlorine, thereby increasing the efficiency of the system since less energy is needed for the electrolysis of hydrochloric acid than sea water or brine.

In another aspect of the invention, batteries provide an electrical current to power the hydrochloric acid electrolysis cell. Alternatively, solar energy powers the cell.

In another aspect of the invention, bottled hydrogen and chlorine are connected directly to the solar reactor. The hydrochloric acid produced in the gas-water reactor may be either fed back to the hydrochloric acid electrolysis cell so that the cycle is continuously repeated, or stored and fed to the electrolyzer at a later time.

In another aspect of the invention, hydrogen chloride or hydrogen and chlorine from volcanic sources are connected directly to the reactor. The hydrochloric acid formed in the gas-water reactor is recycled through the electrolyzer and the resulting gases, hydrogen and chlorine, are either stored, used as supplementary reactants, or removed as by-products of the system.

BRIEF DESCRIPTION OF THE DRAWINGS

Other objects, features and advantages of the invention will become more apparent and fully appreciated from the following detailed description of the various embodiments, taken in conjunction with the accompanying drawings in which.

DETAILED DESCRIPTION

Throughout the detailed description of the embodiments of the present invention, like numerals will correspond to like elements in the figures.

Figure 1:
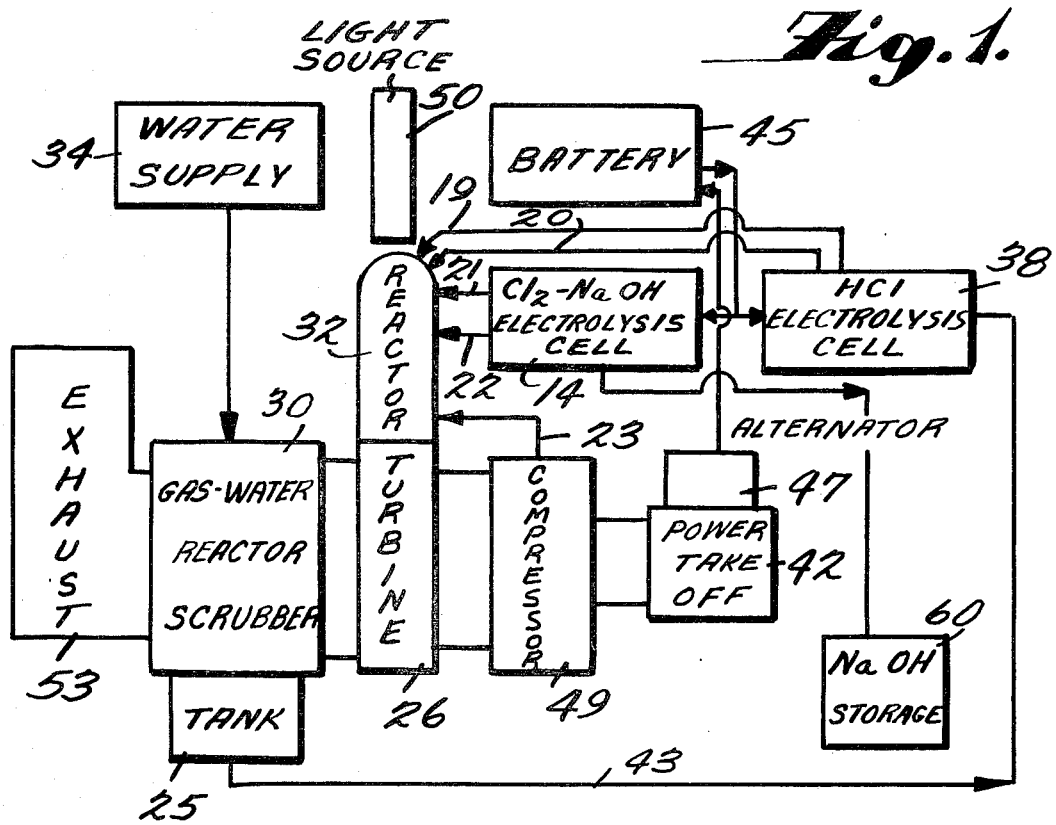
FIG. 1 is a block diagram of the first embodiment of the electromagnetic reactor engine system.

The primary generation system for this invention is fully explained in U.S. Pat. Nos. 3,998,205, 4,024,715 and 4,026,112, held by the inventors of this invention. The subject matter of these patents is incorporated herewith by reference thereto. As illustrated in FIG. 1, the first embodiment of the invention includes a chlorine-sodium hydroxide electrolysis 14 cell which is powered by battery 45. The cell 14 produces hydrogen and chlorine as the initial supply of reactants, which are conveyed to the reactor 32 via lines 21 and 22 respectively. The reactor 32 is powered by solar or artificial light source 50 which contains electromagnetic energy from infrared, through the visible, to the near and middle ultraviolet frequencies as provided by the sun. Higher frequencies may be utilized, such as upper ultraviolet, gamma, and x-ray radiation. If solar energy is being used, copending application Ser. No. 692,495 discloses a method of collecting and intensifying such light. The hydrogen and chlorine exothermically react when energized by the electromagnetic radiation in the presence of atmospheric oxygen, supplied to the reactor 32 by compressor 49 and line 23. The reactor produces hydrogen chloride at a high temperature and pressure which is used to turn the rotor of turbine 26, which in turn powers compressor 49, power take off 42, and alternator 47 which charges battery 45. The spent gases are exhausted from the turbine 26 into the gas-water reactor scrubber 30 where they are scrubbed by water from water supply 34. The hydrogen chloride gas combines with water to form hydrochloric acid which drops into tank 25. The remaining gases escape through exhaust 53 into the atmosphere. The hydrochloric acid from tank 25 is fed to hydrochloric acid electrolysis cell 38 via line 43. The chlorine-sodium hydroxide cell 14 may then be shut down since hydrogen and chlorine may be conveyed to reactor 32 through lines 19 and 20 from the hydrochloric acid electrolysis cell 38. Cell 38 requires less than half the energy required by the chlorine-sodium hydroxide cell 14, thereby leaving more energy for other work.

Figure 2:
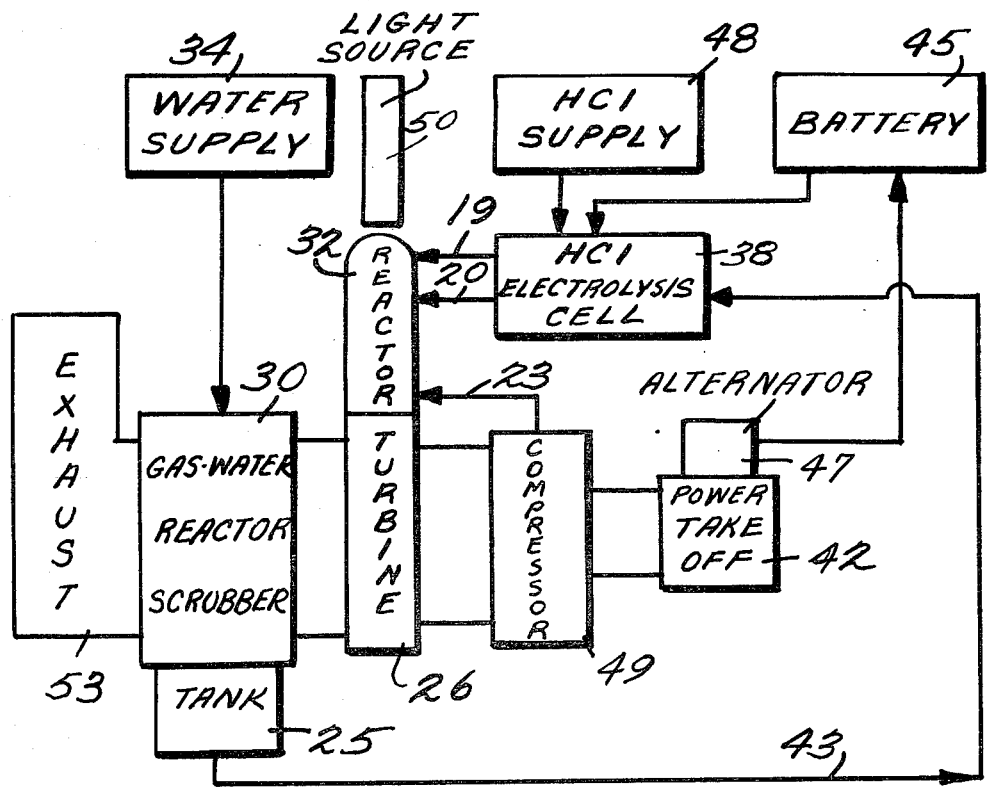
FIG. 2 is a block diagram of the second embodiment of the electromagnetic reactor engine system.

FIG. 2 is a block diagram of the second embodiment of the invention. The initial quantity of reactants for reactor 32 are produced in hydrochloric acid electrolysis cell 38 from hydrochloric acid in supply 48. The remainder of the system is identical to that of the first embodiment illustrated in FIG. 1. The second embodiment requires less than half the energy for start-up than the first embodiment since the hydrochloric acid cell 38 requires less energy than the chlorine-sodium hydroxide cell 14 of FIG. 1.

Figure 3:
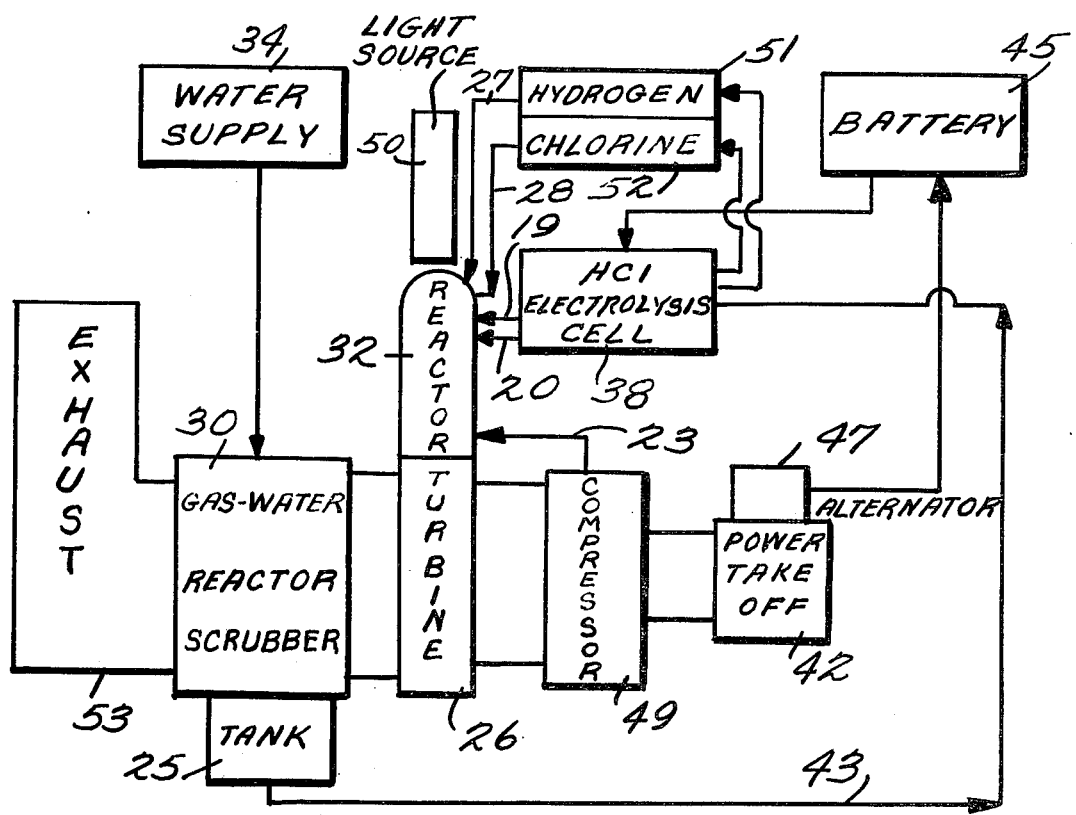
FIG. 3 is a block diagram of the third embodiment of the electromagnetic reactor engine system.

The third embodiment of the present invention is illustrated in FIG. 3. Again, this invention differs from the previous embodiments only in the method of providing the initial quantity of reactants for reactor 32. In this embodiment, the initial reactants are supplied from containers 51 and 52 containing hydrogen and chlorine respectively. The reactants are conveyed from containers 51 and 52 through lines 27 and 28 to the reactor 32. After the initial start-up period, hydrochloric acid electrolysis cell 38 is used to both supply reactor 32 with reactants and to recharge containers 51 and 52. This embodiment requires no start-up energy as required by chlorine-sodium hydroxide cell 14 in FIG. 1 or the hydrochloric acid cell 38 in FIG. 2.

Figure 4:
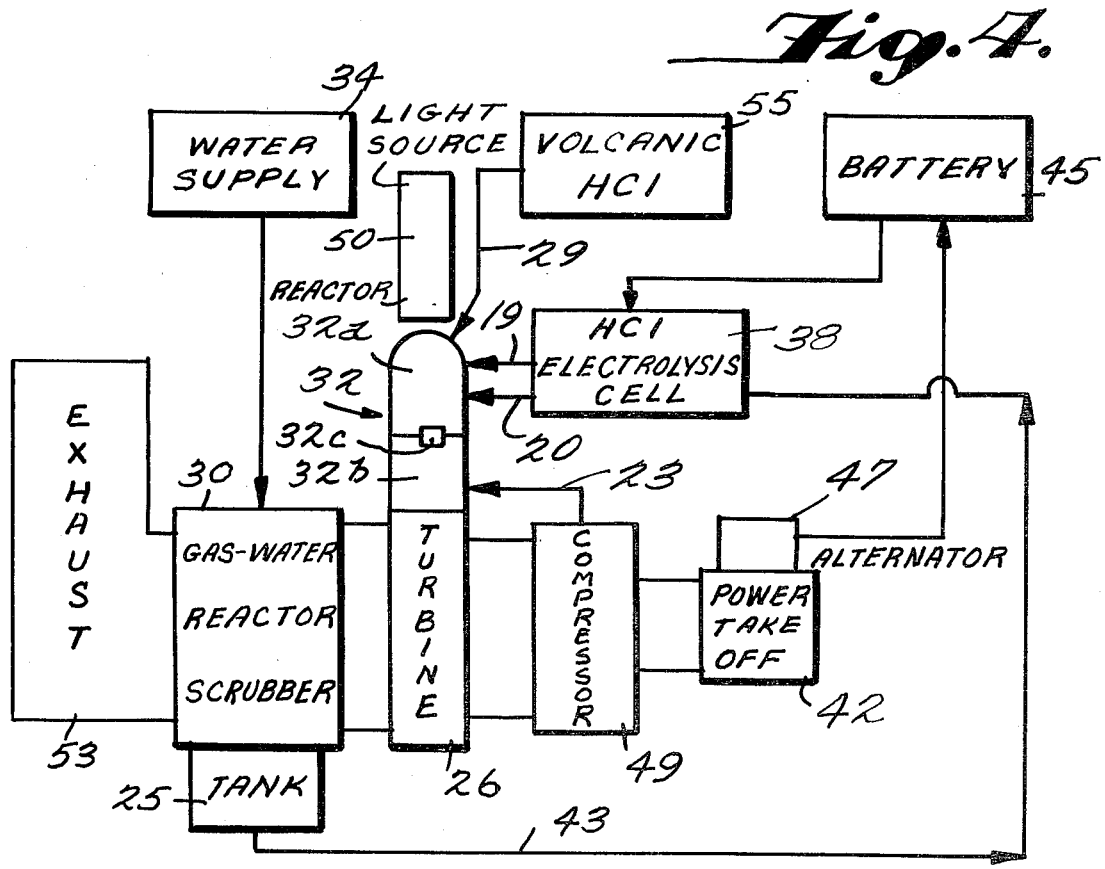
FIG. 4 is a block diagram of the fourth embodiment of the electromagnetic reactor engine system.

The fourth embodiment as illustrated in FIG. 4 shows yet another method of providing the initial supply of reactants to reactor 32. In this embodiment, hydrogen chloride from a volcanic source 55 is conveyed directly to reactor 32 via line 29. This embodiment requires the use of a two-stage reactor as is disclosed in copending application Ser. No. 692,495 by the inventors of the present invention. The hydrogen chloride from source 55 is introduced into the oxygen-free combustion chamber 32a. There, the energy from electromagnetic source 50 is used to ionize the hydrogen chloride. The energy imparted by electromagnetic source 50 heats and expands the ionized gas and forces the gas through valve port 32c into combustion chamber 32b. In chamber 32b, in the presence of oxygen supplied by line 23, the ionized gases recombine to form hydrogen chloride in an exothermic reaction. The source of volcanic hydrogen chloride 55 may either be a volcano directly or a container of gases from a volcano. This embodiment requires no external start-up energy as required by the previous embodiments. The hydrochloric acid produced in the gas-water reactor scrubber 30 may either be conveyed back to hydrochloric acid electrolysis cell 38 via line 43, or stored for stand-by use, or removed from the engine system as a by-product.

Figure 5:
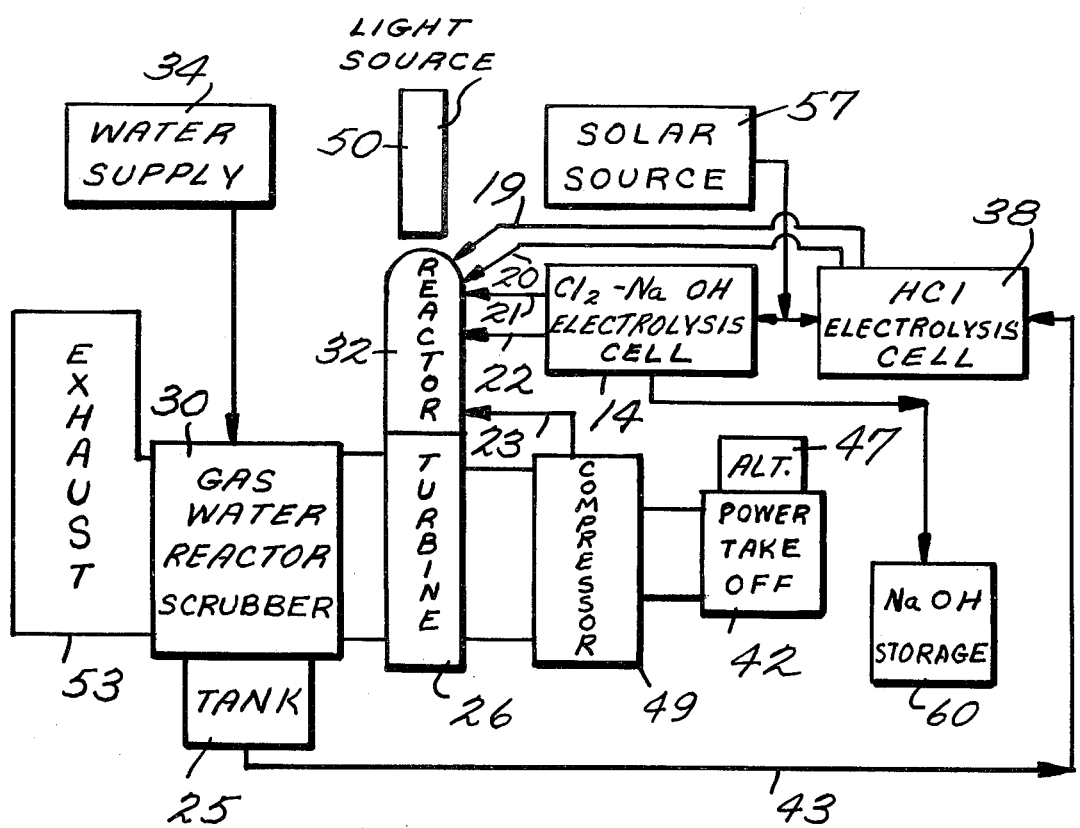
FIG. 5 is a block diagram of the fifth embodiment of the electromagnetic reactor engine system.

The fifth embodiment of this invention as illustrated in FIG. 5 demonstrates that the electrolysis cells in any of the previous embodiments may be alternatively powered by solar source 57. The use of solar energy to power electrolysis cells is well known in the art, as discussed in the article entitled "Fueling the Future with Water", Science News, Vol. 10, p. 152, Sept. 4, 1976.

In addition to the embodiments described in detail above, those skilled in the art will readily appreciate that many other modifications are possible in the embodiments without materially departing from the novel teachings and advantages of this invention. Accordingly, all such modifications are intended to be included within the scope of this invention as defined by the following claims.

What is claimed is:

1. An electromagnetic engine system comprising:
   an electromagnetic reactor;
   a hydrochloric acid electrolysis cell;
   means for generating chlorine and hydrogen in said hydrochloric acid cell;
   means for controllably coupling said chlorine and hydrogen to said reactor;
   means for controllably coupling oxygen to said reactor;
   means for directing electromagnetic radiation into said reactor to thereby exothermically react said hydrogen and chlorine in the presence of said oxygen to generate hydrogen chloride at a high pressure and temperature level;
   a turbine attached to said reactor to enable said generated hydrogen chloride to drive the rotor of said turbine;
   a gas-water reactor scrubber attached to said turbine to receive the spent hydrogen chloride from said turbine;

means for converting said spent hydrogen chloride to hydrochloric acid; and means for conveying said hydrochloric acid to said hydrochloric acid cell.

2. The system of claim 1 further comprising:
means for supplying initial quantities of hydrogen and chlorine to said reactor;
a power utilization device attached to said turbine; and
means for powering said hydrochloric acid cell.

3. The system of claim 1 wherein said electromagnetic radiation is solar light.

4. The system of claim 1 wherein said electromagnetic radiation is artificial light.

5. The system of claim 2 wherein said initial supplying means comprises:
a chlorine-sodium hydroxide electrolysis cell;
means for powering said chlorine-sodium hydroxide cell;
means for generating initial quantities of chlorine and hydrogen in said chlorine-sodium hydroxide cell; and
means for coupling said initial quantities of chlorine and hydrogen to said reactor.

6. The system of claim 2 wherein said initial supplying means comprises an initial supply of hydrochloric acid for said hydrochloric acid cell so that said hydrochloric acid cell initially has the material necessary for the production of hydrogen and chlorine.

7. The system of claim 2 wherein said initial supplying means comprises:
a container of hydrogen;
a container of chlorine; and
means for coupling said containers of chlorine and hydrogen to said reactor.

8. The system of claim 7 wherein said initial supply means further comprises means for recharging said containers of hydrogen and chlorine with the gases produced in said hydrochloric acid cell.

9. The system of claim 2 wherein said initial supplying means comprises:
a volcanic source of hydrogen chloride;
means for coupling said volcanic source to said reactor; and
means for ionizing said volcanic hydrogen chloride into components that can react in said reactor.

10. The system of claim 2 wherein said powering means comprises:
a battery electrically connected to said hydrochloric acid cell;
an alternator communicating with said power utilization device so that power is derived from said device; and
means for charging said battery with said alternator.

11. The system of claim 2 wherein said powering means comprises solar energy.

12. The system of claim 5 wherein said means for powering said chlorine-sodium hydroxide cell comprises solar energy.

13. The system of claim 5 wherein said means for powering said chlorine-sodium hydroxide cell comprises:
a battery electrically connected to said chlorine-sodium hydroxide cell;
an alternator communicating with said power utilization device so that power is derived from said device; and
means for charging said battery with said alternator.

14. A method of transforming solar energy to an alternate form of power comprising the steps of:
generating chlorine and hydrogen in a hydrochloric acid electrolysis cell;
controllably coupling said hydrogen and chlorine to an electromagnetic reactor;
controllably coupling oxygen to said reactor;
directing electromagnetic radiation into said reactor to thereby exothermically react said hydrogen and chlorine in the presence of said oxygen to generate hydrogen chloride at a high pressure and temperature level;
using said generated hydrogen chloride to drive the rotor of a turbine;
converting spent said hydrogen chloride from said turbine to hydrochloric acid; and
conveying said hydrochloric acid to said hydrochloric acid cell.

15. The method of claim 14 further comprising the steps of:
supplying initial quantities of hydrogen and chlorine to said reactor; and
using the power produced by the turbine.

16. The method of claim 15 wherein said initial supplying step further comprises the steps of:
generating initial quantities of chlorine and hydrogen in a chlorine-sodium hydroxide cell; and
coupling said initial quantities of chlorine and hydrogen to said reactor.

17. The method of claim 15 wherein said initial supplying step further comprises the step of supplying said hydrochloric acid cell with an initial quantity of hydrochloric acid so that said hydrochloric acid cell initially has the material necessary for the production of hydrogen and chlorine.

18. The method of claim 15 wherein said initial supplying step further comprises the step of coupling containers of chlorine and hydrogen to said reactor.

19. The method of claim 18 wherein said initial supplying step further comprises the step of recharging said containers with the gases produced in said hydrochloric acid cell.

20. The method of claim 15 wherein said initial supplying step further comprises the steps of:
coupling a volcanic source of hydrogen chloride to said reactor; and
ionizing said volcanic hydrogen chloride into components that can react in said reactor.

* * * * *